United States Patent

Sorstokke et al.

[15] 3,694,527
[45] Sept. 26, 1972

[54] PROCESS FOR THE PREPARATION OF BIS (BETHACHLOROETHYL) VINYL PHOSPHONATES

[72] Inventors: Harold E. Sorstokke, New City, N.Y.; Walter Stamm, Tarrytown, N.Y.; Eugene H. Uhing, Ridgewood, N.J.

[73] Assignee: Stauffer Chemical Company, New York, N.Y.

[22] Filed: Feb. 9, 1970

[21] Appl. No.: 14,705

Related U.S. Application Data

[63] Continuation of Ser. No. 629,065, April 7, 1967, Pat. No. 3,548,040.

[52] U.S. Cl. .................................. 260/986, 260/957
[51] Int. Cl. .................................................. C07f 9/40
[58] Field of Search ...................................... 260/986

[56] References Cited

UNITED STATES PATENTS 3,548,040  12/1970  Sorstokke et al. ......... 260/986

*Primary Examiner*—Lewis Gotts
*Assistant Examiner*—Anton H. Sutto
*Attorney*—Robert C. Sullivan, Donald M. Mackay and Paul J. Juettner

[57] ABSTRACT

Olefinically unsaturated alkyl phosphonates suitable for use as copolymerizing agents, terminating agents and crosslinking agents formed by the selected dehydrohalogenation of a beta-halo-alkyl phosphonate corresponding to the product desired through the use of an improved dehydrohalogenation system. This dehydrohalogenation system comprises an alkali metal carbonate present in an amount stoichiometric to the amount of material to be dehydrohalogenated and a phenolic catalyst present in an amount of from about 0.01 to about 0.2 moles per mole of the product to be dehydrohalogenated. The dehydrohalogenation is desirably conducted at a temperature from about 90° to about 130° C. Preferred embodiments of this invention involve the use of sodium carbonate or bicarbonate and a phenolic catalyst, such as nitrophenol, or chlorophenol.

10 Claims, No Drawings

PROCESS FOR THE PREPARATION OF BIS (BETHACHLOROETHYL) VINYL PHOSPHONATES

CROSS REFERENCE TO RELATED APPLICATION

This application is a continuation of application, Ser. No. 629,065, filed Apr. 7, 1967 which is now U.S. Pat. 3,548,040, patented Dec. 15, 1970.

The present invention relates to a process for the preparation of olefinically unsaturated alkyl phosphonates by the dehydrohalogenation of the corresponding haloalkyl phosphonate. More particularly, this improved process relates to the use of a dehydrohalogenation system comprising an alkali metal carbonate and a catalytic amount of an organic acid catalyst in admixture.

In recent times various vinyl phosphonates have been used in the polymerization of a wide variety of monomers. These phosphonates have been used as copolymerizing agents, terminating agents and cross-linking agents in those applications where a degree of flame retardance is of especial value in polymeric compositions since such phosphonates do impart a degree of flame resistance to the polymer compositions without adversely affecting other desirable properties of the polymer or polymer composition. With the increase in interest in these compounds, various methods of preparing these compositions were proposed. The most effective methods proposed for the aforesaid preparation of these compounds was by the dehydrohalogenation of a corresponding β-halo alkyl phosphonate through the use of a stoichiometric amount of an alkali metal salt of a lower fatty acid. Preferred among such fatty acid alkali metal salts has been anhydrous sodium acetate. Utilization of this dehydrohalogenation agent results in yields of from about 10 percent to about 90 percent. Particular procedures and descriptions of such dehydrohalogenation reactions and reactants are found in U.S. Pat. No. 2,959,609 issued Nov. 8, 1960 to Leupold Zorn, the corresponding German D.A.S. 1,006,414, published on Apr. 18, 1957, and U.S. Pat. No. 3,064,030 issued Nov. 13, 1962 to Chadwick et al.

Another dehydrohalogenation agent which has been proposed in the past is the less expensive sodium carbonate. The use of this agent, however, produces low yields, about 50, percent, requires higher reaction temperatures and accordingly is inefficient and impractical.

The use of the more preferred fatty acid alkali metal salt, however, is considerably more costly than the use of the alkali metal carbonate and in spite of the excellent reaction efficiencies effected by this reagent, it tends to lose benefits of this efficiency from an economic standpoint.

In accordance with the present invention, the deficiencies of the prior art have been effectively overcome through the use of a dehydrohalogenation system utilizing an alkali metal carbonate in the presence of an acid catalyst.

By the term "acid catalyst" is meant any organic acid exhibiting a pH value of from 1 to about 6 measured as a 0.1N solution at 25° C. Preferred in this category are those organic acids exhibiting a pH value of from about 2 to about 4. The organic acid should also desirably exhibit solubility in water and the alkali metal salt of such acid should exhibit a slight degree of solubility in the organic phase.

Such acids having an infinite solubility in water can be used as well as acids having as low a solubility as 0.1 grams per hundred milliliters of water at the reaction temperatures. In fact acids having even a lower degree of solubility can be used but are not preferred. Similarly, the acid salt should be soluble in the organic phase of the reaction, i.e., in the haloalkyl bis haloalkyl phosphonates to approximately the same degree. The desire that the acids exhibit a high degree of solubility in water as well as the salts is predicated upon the fact that these materials represent impurities upon the completion of the reaction and must be removed, preferably by water washing, wherein water solubility becomes a factor.

While any organic acids irrespective of the number of carbon atoms they contain can be used as the catalyst if desired, it is preferred within the teachings of this invention to utilize organic acids containing from about one to about 12 carbon atoms inclusive. Included within this category are both the mono- and polybasic acids. Such mono and polybasic acids encompass compounds having acidic substituents such as carboxylic acid groups, phenolic hydroxyl groups, phosphinic acid groups, phosphonic acid groups, phosphoric acid groups, sulfonic acid groups and the like. Most preferred of these acid catalysts are the organic carboxylic and phenolic acids. This preference is dictated by the relatively low cost, ready availability, high degree of solubility and reactivity of these acids. Illustrative of such organic acids as can be used in the present invention are the aliphatic or fatty acids containing from about one to about 12 carbon atoms inclusive, such as formic acid, acetic acid, propionic acid, butyric acid, pentanoic acid, hexanoic acid, pellaragonic acid, undecanoic acid, methacrylic acid and the like. Cycloaliphatic carboxylic acids such as hexahydrobenzoic acid and the like. Difunctional acids such as oxalic acid, succinic acid, maleic acid, phthalic acid, pyromelitic acid, adipic acid, hexane dicarboxylic acid and the like; the aromatic carboxylic acids such as benzoic acid, aminobenzoic, nitrobenzoic, chlorobenzoic and toluic acid and the like; the phenolic acids such as nitrophenol, chlorophenol, phenol, salicylic acid, cresol and the like; sulfonic acids such as toluene sulfonic acid, octane sulfonic acid and the like, and the organic acids containing phosphorus such as the phosphinic acids, phosphonic acids and phosphoric acids such as for example, phenyl phosphonic acid, phenyl phosphinic acid and the like.

As indicated above certain organic acids such as the phenols and carboxylic acids are preferred. Of these it is most desired to utilize those having a lower or medium molecular weight. Examples of such low molecular weight desirable acids are benzoic, hexahydrobenzoic, heptanoic, propionic, chloroacetic, acetic, phenol, pentachlorophenol, dinitrophenol and the like. Although dibasic and polybasic acids can be utilized herein as indicated above, there has been found to be no particular advantage in utilizing such acids. It is further preferred that the acids be amine-free as acids containing amine groups tend to give lower yields.

When the acids of the present invention are utilized with the alkali metal carbonate of this invention, alkali metal salts of such acids are formed. While it is preferred to use free acid in the catalyst system of the present invention as starting reactant materials within the catalyst system, it is of course possible to utilize alkali metal salts of such acids within the system as indicated in the present invention, and such salts are intended to be included within the terms of this invention.

By the term "alkali metal carbonate" is meant carbonates and bicarbonates of the group 1 A metals of the periodic table. Illustrative of such alkali metals are lithium, sodium, potassium, and the like. Of these alkali metals sodium is preferred both in respect to the salts of the organic acids which as indicated above can be used as well as the carbonates set forth below. The preference for sodium is predicated on availability, low cost, high reactivity of this element. The ammonium ion is generally considered to be an equivalent to the alkali metal ions and it is an equivalent in the present invention and is considered to be within the term "alkali metal" as used herein.

When an acid salt is utilized in place of the free acid it is effectively used in the same ratio as the free acid. The carbonate component is utilized also in the same effective amount. However, adjustment can be made for the amount of carbonate utilized initially in converting free acid to salt.

The process of this invention is applicable to compounds of the formula:

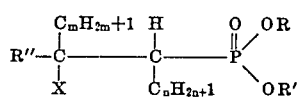

wherein $n$ and $m$ are integers having values of from about 0 to about 6 and preferably from about 0 to about 4, X is a halogen atom having a molecular weight greater than 30, such as chlorine, bromine or iodine, R and R' are hydrocarbyl groups consisting essentially of hydrogen and carbon and containing from about one to about 18 carbon atoms inclusive. R" is a hydrocarbyl group consisting essentially of hydrogen and carbon and containing from 0 to 18 carbon atoms such that when R" contains 0 carbon atoms R" is hydrogen.

By the term hydrocarbyl, consisting essentially of hydrogen and carbon is meant hydrocarbon groups such as the aliphatic and aromatic groups the hydrocarbon groups may be substituted by, or include only such groups as do not affect the essential reactivity or character of the group. Such groups include any inert or non-reactive substituent such as chloro groups, fluoro groups, nitro groups, hydroxy groups, mercapto groups, sulfone groups, ethoxy groups, methoxy groups, nitrile, thioether groups, ether groups, ester groups, keto groups, sulfone groups and the like. Illustrative of such aliphatic groups as are represented by R, R' and R" above are alkyl, such as methyl, ethyl, propyl, butyl, pentyl, hexyl, nonyl, pentenyl, hexenyl, cycloalkyl, such as cyclopropyl, cyclobutyl, cyclopentyl, cyclohexyl, cyclohexenyl and the like; and the aromatic, such as phenyl, benzyl, phenethyl, tolyl, naphthyl, and the like.

Particularly in point is the case wherein n is O and R and R' are chloroethyl and R" is hydrogen as this compound is the precursor for the Bis($\beta$-chloroethyl) vinyl phosphonate. This product will be used hereinafter as representative of this class of compound, and for convenience will be designated "Bis Beta."

The term carbonate in respect to that moiety of the dehydrohalogenation system is intended to include the traditional carbonates $CO_3$—, as well as the inclusive bicarbonates $HCO_3$—. Particularly preferred alkali metal carbonates are sodium carbonate and sodium bicarbonate because of their low cost and availability.

The dehydrohalogenation of this invention is effectively conducted at a temperature of from about 90° to about 130° C. It is of course desirable to use as low an effective temperature as possible, which will effect the highest yield during the shortest period of time. A particularly effective temperature range in this respect is from about 115° to about 125° C. It should be noted, however, that this reaction can be conducted at temperatures of from room temperature and less to about 225° C. Low temperatures, however, adversely affect the rate of reaction and higher temperatures increase cost.

The dehydrohalogenation reaction can be conducted in the presence of a suitable inert solvent, although the presence of such solvent is neither necessary nor especially desirable. Illustrative of suitable inert solvents are acetone, methyl ethyl ketone, dimethyl ether, diethyl ether, acetonitrile, methanol, benzene, toluene, chlorobenzene, tetrahydrofuran, carbon tetrachloride, dimethyl sulfoxide, diglyme, dimethyl-sulfide, dimethyl sulfoxides, nitroethane, nitrobenzene, carbon bisulfide, glycols, dioxane, cyclohexane, heptane, petroleum ether and the like.

Atmospheric pressure can be used in the dehydrohalogenation reaction although sub-atmospheric pressure and super-atmospheric pressure can also be utilized if desired. It will be noted in the example of Table 1 that sodium bicarbonate and acetic acid were utilized in one run at reduced pressure. In another run using sodium carbonate and acetic acid at atmospheric pressure the yield in both instances was approximately 90 percent.

As indicated above, the improved dehydrohalogenation system of this invention can also be prepared through the use of a small amount of an alkali metal organic acid salt instead of the free acid catalyst or in accordance with another embodiment of this invention. It is preferred, however, to utilize the free acid catalyst which is charged to a quantity of alkali metal carbonate thereby forming the acid salt in situ.

The amount of the dehydrohalogenation agent (alkali carbonate) which is used in the dehydrohalogenation reaction is generally about a stoichiometric amount. However, small excess amounts of the dehydrohalogenation agent can be utilized effectively if desired. When excess agent is utilized it is generally used in an excess amount of from 2 to about 10 percent by weight based upon the chloroethylphosphonate. It should be noted, however, that when the dehydrohalogenation reaction is conducted in a continuous system the amount of dehydrohalogenation agent used is that necessary to stoichiometrically dehydrohalogenate the material being passed through for a given period of time. Accordingly, the initial amount of material present may be greatly in excess.

The dehydrohalogenation system of this invention generally comprises an alkali metal carbonate utilized in approximate stoichiometric amounts based on the amount of material to be dehydrohalogenated and an organic acid catalyst in an amount of from about 0.01 to about 0.2 moles per mole of the material to be dehydrohalogenated. This generally constitutes a mole ratio of from about 25:1 to about 2:1 of alkali metal carbonate to acid catalyst. Especially preferred have been found to be mole ratios of from about 10:1 to about 4:1 carbonate to acid catalyst. While stoichiometric amounts of the carbonate are effective, slight excesses of the carbonate portion of the dehydrohalogenation system can be used if desired. It has been found, however, that large excesses of the carbonate material have an adverse effect on the reaction and accordingly reduce yields.

It is of course understood that mixtures of acids as defined herein can be employed as the acid catalysts and similarly mixtures of carbonates as defined herein can also be employed.

Materials used as ingredients in the catalyst system of this invention can be of any commercial degree of purity, provided impurities present do not adversely effect the conduct of the reaction or conditions of reaction. Of course it is understood that if impure materials be used adjustments must be made within the system to provide an excess amount of active carbonate and/or active acid. Grades of purity which may be used include reagent C.P. commercial and crude.

While it is not desirable to utilize aqueous solvents or aqueous containing solvents, the reaction conditions need not be anhydrous. Although the reaction can be effectively conducted under anhydrous conditions, stringent control is unnecessary. Water present in the reactants or dehydrohalogenation agents does not adversely effect the degree of yield unless such water is present in excessive amounts. Water present in amounts from about 1 to about 20 percent based on the weight of the materials does not produce any adverse effect. Such water, however, must be ultimately removed and accordingly, it is desired to maintain water to a minimum.

Foaming of the reaction mixture during the reaction of this invention can pose a serious problem, and for this reason it is desirable to generally add a foam depressant such as are generally known in the art, to inhibit such formation. Positive pressures can also be employed to suppress foaming. Since foaming is caused by a release of $CO_2$ during the reaction it cannot be completely eliminated. It can, however, be substantially controlled by the means indicated above.

When a solvent is utilized in the conduct of this reaction, the product can be effectively purified and recovered by filtration and distillation. When the reaction is conducted in the absence of a solvent the product can be recovered directly and can be effectively purified by washing with water. Washing provides the simplest means to purify the product but it does result in a slight loss in product, usually less than about 2 percent.

In the examples below and throughout the specification all parts and percentages are by weight unless otherwise specified.

EXAMPLE 1

Preparation of Bis-2-chloroethyl Vinyl Phosphonate

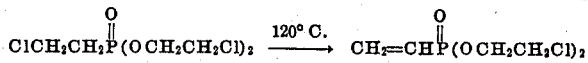

Various reactions are conducted utilizing different dehydrohalogenation agents and systems. The temperature of the reaction is maintained at 120° C. in each instance. The reaction times are indicated below in Table I. In each case an equivalent charge of chloroethyl bis-2-chloroethyl phosphonate is charged to the reaction vessel. In each instance, except as indicated, a stoichiometric amount of dehydrohalogenation catalyst is added to the reaction vessel. The vessel was then raised in temperature to approximately 120° C. which is maintained for the reaction period. The reaction product mixture is then analyzed for percentage of product. The agents and systems used, the conditions of the reaction and the percentage product obtained is shown in Table 1 following.

TABLE 1

Dehydrohalogenation of $ClCH_2–CH_2–P(O)(OCH_2–CH_2–Cl)_2$

| Dehydrohalogenation agent | Temperature, °C. | Reaction period, hours | Total amount agent | Pressure | Approximate yield, percent |
|---|---|---|---|---|---|
| 1........ Calcium oxide | 120 | 2 | Stoichiometric | Atmospheric | 20. |
| 2........ Sodium carbonate | 120 | 4 | ....do.... | ....do.... | Trace. |
| 3........ Sodium bicarbonate | 120 | 2 | ....do.... | ....do.... | Do. |
| 4........ Sodium bicarbonate and 5%+ water | 120 | 4 | ....do.... | 30 mm./merc | 40. |
| 5........ Sodium carbonate and 5%+ water | 120 | 2 | ....do.... | 30 mm./merc | Trace. |
| 6........ Sodium bicarbonate and 5%+ acetic acid | 120 | 2 | ....do.... | 30 mm./merc | 90. |
| 7........ Sodium carbonate and 5%+ acetic acid | 120 | 2 | ....do.... | Atmospheric | 90. |
| 8........ (5%) + acetic acid | 120 | 4 | 5% stoichiometric | | (<10%).* |
| 9........ (5%) + sodium acetate | 120 | 4 | ....do.... | | (<10%).* |
| 10....... Acetic acid | 120 | 2 | Stoichiometric | Atmospheric | Ester of acetic acid obtained. |
| 11....... Sodium acetate | 120 | 2 | ....do.... | ....do.... | 92%. |

+ Mole percent.
* Postulated on theory in view of data of Examples 1–7 and 10–11.

In Table 1 yields are determined by gas chromatographic analysis or on the basis of distilled yield. EXAMPLE example 2

In this example and the others which follow chloroethyl bis(2-chloroethyl)phosphonate, hereinafter designated CEP was used. The CEP used had the following assay as determined by distillation.

76 percent CEP (Boiling point at 0.25 millimeters of mercury 154°–164°C.)
17 percent Residue
7 percent Low boiling fraction
less than 1 percent $P(OCH_2CH_2Cl)_3$ The following ingredients were utilized as specified:

| Reactants | Amt. (grams) | Moles |
|---|---|---|
| CEP (76%) | Acetic 287.8 | 0.812 |
| Acetic Acid (100%) | 6.4 | 0.107 |
| Sodium Carbonate (anhydrous powder) | 56.7 | 0.535 |
| Sodium Bicarbonate (powder) | 6.0 | — |
| Solvent (benzene) | 88 | — |
| BIS-BETA (product 99%+ purity) | 183.8 | 0.788 |

In a one liter 3-neck Pyrex reaction flask equipped with paddle stirrer (600 rpm), nitrogen gas inlet and outlet, and thermometer were placed 287.8 grams of crude CEP of 76 percent assay (0.812 mole CEP on 100 percent basis). To this was added 6.4 grams (0.1 mole) of acetic acid (10 mole percent based on crude CEP) and 56.7 grams of anhydrous sodium carbonate (0.535 mole). This is the theoretical amount for 287.8 grams of 100 percent CEP.

The reaction was kept under a stream of nitrogen and stirred while the reaction was heated to 120° C. over a 30–45 minute period. There was a noticeable liberation of $co_2$ when the reaction temperature reached 95°–100° C. which can cause a serious foaming problem if the heating rate is not carefully controlled during this critical period. The reaction was slightly exothermic during this stage. The reaction was kept at 120° C. for 1–1.5 hours.

It was then cooled to 20°–25° C. and 290 milliliters of water were added. The reaction was stirred for 15–20 minutes to dissolve the solid sodium chloride formed during the reaction. The reaction mixture was then placed in a separatory funnel and allowed to stand 1/2–1 hour to separate the two layers.

The bottom product layer (milky) was drained into a flask. Its weight was 242 grams. The water layer was extracted with 50 milliliters of benzene. The benzene (top layer) was stripped to remove the solvent. It contained 6.5 grams of organic material which was combined with the product layer. The product layer contained about 20 grams of water. This layer was extracted with 240 milliliters of water adjusted to a pH of 7–8 with 6 grams of sodium bicarbonate. The organic layer was placed in a distillation flask. The water layer was then extracted with 50 milliliters of benzene. The benzene layer contained 10 grams of organic material. The benzene layer can be combined directly with the product or stripped separately and the organic residue added to the product.

The product was stripped under 1 to 10 millimeters of mercury pressure to remove the water at 100° C. The residual product weight was 214 grams. This product was distilled at 0.2–0.5 millimeter mercury pressure without a column. About 30 grams of undistillable residue remained in the distillation flask.

Yield of BIS-BETA = 183.8 grams (0.788 mole = 97 percent yield)

Physicals: Boiling point 113°–130° C./0.3 mm.
Refractive index $n_D^{25}$ = 1.4755
Acidity: 0.4 milliliters 0.1 N NaOH/10 grams
Elemental Analyses: Found: 13.0% P; 30.3% Cl; bromine No. 685
Theoretical: 13.3% P; 30.4% Cl; bromine No. 682
G.C.[+] Assay: 99 + wt. % BIS-BETA
0 wt. % CEP Reproducibility of this procedure using 3 different samples of CEP:

```
96.5% yield
97.0 yield
97.2 yield
mean 96.9 + 0.6%
  pH of first water wash              2.0
  Moles NaCl in first water wash      0.975
  Moles NaCl in second water wash     0.020
  Total moles of NaCl formed          0.995
  Amount of Na₂CO₃ converted to NaCl = 93%
```

G.C. assay is gas chromatograph assay.

EXAMPLE 3

Process Variations

Several of the reaction variables (time, temperature, amount of $Na_2CO_3$ and acid catalyst) were studied.

A detailed study of reaction variables was mode:
1. To determine optimum conditions.
2. Determine rate change when sodium carbonate is consumed and only sodium acetate remains to perform the dehydrochlorination.

1. Reaction Rate

The rate at which $CO_2$ is liberated was studied at reaction temperatures of 95°–100° C. and 120° C. The reactions contained 100 grams crude CEP (76 percent assay) 19.66 $Na_{grams}$ $_{Na2}CO_3$ (theory) and 2.2 grams acetic acid. Both reactions were started at room temperature. The $CO_2$ was collected over 0.5 N $H_2SO_4$ and no corrections made for solubility of $CO_2$ in 0.5 N $H_2SO_4$ and/or variations from standard conditions. The results are shown in Table 2.

TABLE 2

| Time | C.C. $CO_2$ Collected at 95°–100°C. | 120°C |
|---|---|---|
| 10 | 350 | 2000 |
| 20 | 600 | 3800 |
| 30 | 950 | 4200 |
| 40 | 1450 | — |
| 50 | 2000 | 4300 |
| 60 | 2400 | |
| 70 | — | |
| 80 | 3000 | |
| 90 | — | |
| 100 | | |
| | 3500 | |
| 110 | — | |
| 120 | 3800 | |
| 130 | 3850 | |
| 140 | — | |
| 150 | 3850 | |

It was observed that the $CO_2$ liberation rate becomes quite fast at 80°–90° C. to 120° C. The rate appears to follow the expected doubling per 10°C. increase in temperature. The difference in the amount of $CO_2$ collected at 120° C. and 95°–100° C. as shown in Table 2, is due to the observed fact that $CO_2$ is being slowly absorbed in the 0.5 N $H_2SO_4$ so that longer contact time will reduce the observed volume, though the actual amount liberated is identical.

2. Effect of various amounts of acetic acid

The effect on yield of BIS-BETA by using various amounts of acetic acid with pure CEP and the theoretical amount of $Na_2CO_3$ with 3 hours or reaction time at 120° C. is shown in Table 3.

TABLE 3

Effect of Acetic Acid on Yield of BIS-BETA (Using theory of $Na_2CO_3$ at 120°C. for 3 hrs.)

| Acetic Acid (mole/mole CEP) | Weight Yield (g/100 g CEP) | G.C. Assay (% BIS-BETA) | (% CEP) | Yield (% Theory) |
|---|---|---|---|---|
| 0.05 | 82.4 | 91 | 7 | 87 |
| 0.2 | 85.2 | 88 | 5 | 87 |

The G.C. assay is based on a single gas chromatographic run with internal standard. Results are relative to a reference sample assumed to be 98 percent pure. A reproducibility study of a sample gave 89, 88, 92 and 92 wt.-% BIS-BETA (mean 90 ± 4 wt.-%).

The results shown in Table 3 do not show any significant effect on yield when using 0.05 and 0.2 mole percent acetic acid under conditions described. This data also establishes the fact that the acid, acetic acid, serves as a catalyst.

3. Effect of various amounts of $Na_2CO_3$

The effect of using various amounts of $Na_2CO_3$ on the yield of BIS-BETA using crude CEP (76% assay) with 10 mole percent acetic acid at several reaction times at 120° C. is shown in Table 4.

TABLE 4

Effect of $Na_2CO_3$ on Yield of BIS-BETA (with 10 mole % acetic acid at 120°C. and crude CEP)

| Hr. | $Na_2CO_3$ (Moles/269 g. crude CEP) | Weight Yield (g/100 g. CEP) | G.C. Assay (%BIS-BETA) | Yield (% Theory) |
|---|---|---|---|---|
| 2 | 0.475 | 75.7 | 93+ | 99 |
| 0.5 | 0.5 | 76.4 | 86 | 99 |
| 1 | 0.5 | 75.7 | 78 | 89 |
| 2 | 0.5 | 75.7 | 86 | 97 |
| 0.5 | 0.525 | 73.9 | 85 | 97 |
| 1 | 0.525 | 77.1 | 82 | 96 |
| 0.5 | 0.55 | 71.7 | 86 | 94 |
| 1 | 0.55 | 71.8 | 84 | 89 |
| 2 | 0.55 | 70.0 | 89 | 99 |

+ This sample contained 0.9% CEP which was absent in all other samples.

The results of Table 4 do not show any advantage in using excess (more than 0.5 mole/269 grams CEP) $Na_2CO_3$. The use of less than theoretical $Na_2CO_3$ left some unreacted CEP in the product.

The effect of reaction time using a 10 percent excess of $NA_2CO_3$ with pure CEP at a reaction temperature of 120° C. on the yield of BIS-BETA is shown in Table 5.

TABLE 5

Effect of Time with a 10% Excess $Na_2CO_3$ on Yield of BIS-BETA (at 120°C.)

| Hr. | Acetic Acid Mole/mole CEP | Wt. Yield (g/100 grams CEP) | G.C. Assay % BIS-BETA | % Residue | Yield (% Theory) |
|---|---|---|---|---|---|
| 0.5 | 0.05 | 82.4 | 98 | nil | 93 |
| 1 | 0.1 | 82.2 | 99 | 0.6[1] | 94 |
| 1.5 | 0.1 | 81.8 | 89 | 9 | 84 |
| 2 | 0.1 | 78.2 | 98 | 2[1] | 87 |

[1]% residue by distillation. The G.C. assay for % BIS-BETA is based on ratio of BIS-BETA to CEP.

The results shown in Table 5 indicate that a 10 percent excess of $Na_2CO_3$ with pure CEP for 1.5 to 2.0 hours at 120° C. is harmful on the yield of BIS-BETA. The increase in the amount of residue also reflects this effect.

The harmful effect of excess $Na_2CO_3$ at long reaction times at 120°C. can also be shown by the fact that more than the theoretical NaCl is formed. The amount of NaCl formed with variations of $Na_2CO_3$ and time are shown in Table 6.

TABLE 6

Amount of NaCl Formed in BIS-BETA Reaction (Pure CEP at 120°C.)

| Hours | Mole/mole CEP $Na_2CO_3$ | Acetic Acid | NaCl | pH of Wash | Yield 1 (% Theory) |
|---|---|---|---|---|---|
| 3 | 0.5 | 0.1 | 0.97 | 2.0 | 94 |
| 0.5 | 0.525 | 0.1 | 0.99 | 3.6 | 81 |
| 1 | 0.525 | 0.1 | 0.99 | 3.5 | 85 |
| 2 | 0.525 | 0.1 | 1.04 | 1.6 | 81 |
| 0.5 | 0.55 | 0.1 | 1.02 | 8.3 | 82 |
| 1.5 | 0.55 | 0.1 | 1.03 | 7.0 | 84 |
| 0.5 | 0.55 | 0.05 | 0.97 | 9.9 | 93 |
| 1.5 | 0.55 | 0.05 | 0.99 | 9.5 | 86 |

[1]The yield is based on G.C. assay figures of the crude product. This series of G.C. assay figures had a wide spread and could result in a % yield of BIS-BETA that is 6% low.

The above table shows that when more than 97 percent theoretical NaCl forms, the yield of BIS-BETA is reduced.

4. Effect of Temperature

No significant difference in the yield of BIS-BETA could be found in reactions run at 100° C. and 120° C. with the theoretical amount of $Na_2CO_3$. At 140° C. there appeared to be an increase in the amount of residue formed as shown in Table 7.

TABLE 7

Effect of Temperature on Yield of BIS-BETA (using theory $Na_2CO_3$ and 0.1 mole % acetic acid with pure CEP)

| Temp. (°C.) | Hours | Wt. Yield (g./100 g. CEP) | G.C. Assay (% BIS-BETA | % CEP | % Residue | Yield (% Theory) |
|---|---|---|---|---|---|---|
| 100 | 1 | (84.5)* | 91.5[1] | 8 | — | 89 |
| 100 | 3 | 84.5 | 93 | 6 | nil | 91 |
| 120 | 1 | 82 | 95[1] | 4 | <1 | 93 |
| 140 | 2 | 83 | 96 | 3 | 3.4 | 92 |

*based on weight yield of the 100°C. at 3 hours reaction of which this was a sample removed at 1 hour.
[1]G.C. Assay based on ratio of BIS-BETA to CEP which is valid when % Residue is low.

5. Effect of Base Used

In Table 8 the results of using $Ca(OH)_2$ at 120° C. are shown.

TABLE 8

Effect of $Ca(OH)_2$ at 120°C. for 3 Hours on Yield of BIS-BETA

| Mole/mole CEP $Ca(OH)_2$ | Acetic Acid | Wt. Yield g./100 g. CEP | G.C. assay % BIS-BETA | Yield (% Theory) |
|---|---|---|---|---|
| 0.5 | 0.2 | 73 | 91 | 77 |
| 0.5 | 0.1 | 74 | 94 | 81 |

Table 8 shows a definite lower yield of BIS-BETA when $Ca(OH)_2$ is used at 120° C. as the base compared to $NaCO_3$. This effect would appear to be less at lower temperatures. The lower yield appears to be due to the $CaCl_2$ attack on the product. The formation of insoluble Ca soaps also makes washing more difficult.

6. Effect of other acid catalysts

A list of other acids tried is given below with a qualitative estimate as to whether they could be used.

| Acid Catalyst | Results |
| --- | --- |
| Heptanoic acid | 97% |
| Benzoic acid | 86% |
| Pentachlorophenol | 88% |

The acid catalysts were used in the 0.1 mole percent range under conditions similar to those used for acetic acid.

The reaction was also tried using larger amounts of water (10–20 percent) with $Na_2CO_3$ in the absence of an acid catalyst. These reactions worked very poorly (50 percent theory NaCl formed) showing that the acid catalyst plays a vital role in the process.

While applicants do not intend to be bound by theory of mechanism, the following postulated theory may be helpful in understanding the present invention. It is believed that the alkali carbonate neutralizes the acid catalyst present in the system to form the corresponding alkali salts. It is believed that these salts enter the surface of the organic phosphonate phase where the dehydrohalogenation takes place. The alkali halide formed in the neutralization precipitates and the acid catalyst is regenerated. This process is believed to be repeated until the reaction is completed, that is final phosphonate has been formed and the alkali carbonate has been consumed. The acid catalyst can be recovered unchanged. Although from a practical standpoint such a small amount of acid, as is utilized in this process, can be conveniently washed out with the phosphonate phase using a water wash. Other theories of the mechanism of this invention, however, may be postulated and may be of greater validity than the one set forth above.

What is claimed is:

1. The method of dehydrohalogenating beta-haloalkyl phosphonate of the formula:

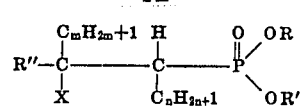

wherein $n$ and $m$ are integers having values of from about 0 to about 6, X is a halogen atom having a molecular weight greater than 30, R and R' are hydrocarbyl groups consisting essentially of hydrogen and carbon and containing from about one to about 18 carbon atoms, inclusive, R'' is a hydrocarbyl group consisting essentially of hydrogen and carbon and containing from 0 to 18 carbon atoms such that when R'' contains 0 carbon atoms, R'' is hydrogen, by heating the said beta-hydroalkyl phosphonate to a temperature between about 90° and about 130° C. while in contact with a dehydrohalogenation catalyst consisting essentially of an alkali metal carbonate and a phenol having a pH value of from about 1 to about 6 utilized in a ratio of from about 25:1 to about 2:1 carbonate to phenol.

2. The method of claim 1 wherein the alkali metal carbonate employed is selected from the group consisting of sodium carbonate, sodium bicarbonate and ammonium carbonate.

3. The method of claim 1 wherein the beta-haloalkyl phosphonate is chloroethyl bis(2-chloroethyl)phosphonate.

4. The method of claim 1 wherein the ratio of catalyst system is from about 10:1 to about 4:1 carbonate to phenol.

5. The method of claim 1 wherein the carbonate portion of The catalyst system is present from about a stoichiometric amount to about 10 percent excess based on the amount of beta-haloalkyl phosphonate to be dehydrohalogenated.

6. The method of claim 1 wherein the reaction is conducted under a positive pressure.

7. The method of claim 1 wherein the phenol is selected from the group consisting of phenol, nitrophenol, chlorophenol, cresol, and salicylic acid.

8. The method of claim 7 wherein the chlorophenol is pentachlorophenol.

9. The method of claim 2 wherein the phenol is selected from the group consisting of phenol, nitrophenol, chlorophenol, cresol, and salicylic acid.

10. The method of claim 9 wherein the chlorophenol is pentachlorophenol.

* * * * *

PO-1050
(5/69)

UNITED STATES PATENT OFFICE
CERTIFICATE OF CORRECTION

Patent No. 3,694,527              Dated September 26, 1972

Inventor(s) Harold E. Sorstokke et al

It is certified that error appears in the above-identified patent and that said Letters Patent are hereby corrected as shown below:

In the Abstract, line 3, after the word "agents" insert -- are --.

Column 1, line 6, the word "u.s." should read -- U.S. --; line 46, delete second " , ";

Column 4, line 3, the formula "CO₃-" should read -- $CO_3^=$ --.
Column 6, lines 47 and 48, the word, "EXAMPLE example2" should read -- EXAMPLE 2 --; line 63, second column, the word "Acetic" should be deleted.
Column 7, line 13, the formula "co₂" should read -- $CO_2$ --; line 67, insert -- + -- before the letters G.C.
Column 8, line 3, EXAMPLE 3, the word "mode" should read -- made --; line 15, the words "19.66 Nagrams na₂CO₃" should read -- 19.66 grams $Na_2CO_3$ --; line 34, delete the number "3500" from the first column and insert -- 3500 -- in the second column after the second dash opposite the number 100.
Column 9, TABLE 5, delete column headings which appear at lines 50 through 53 and insert --

| Hours | Acetic Acid Mole/mole CEP | Weight Yield (g/100 grams CEP) | G.C. Assay %BIS-BETA | % Residue | Yield (% Theory) |
|---|---|---|---|---|---|

--.

Column 10, TABLE 7, delete column headings which appear at lines 41 through 43 and insert --

| Temp (°C.) | Hours | Weight Yield (grams/100 grams CEP) | G. C. Assay % BIS-BETA | % CEP | % Residue | Yield (% Theory) |
|---|---|---|---|---|---|---|

--.

... over ...

PO-1050
(5/69)

UNITED STATES PATENT OFFICE
CERTIFICATE OF CORRECTION

Patent No. 3,694,527  Dated September 26, 1972

Inventor(s) Harold E. Sorstokke et al

It is certified that error appears in the above-identified patent and that said Letters Patent are hereby corrected as shown below:

Column 10, TABLE 8, delete column headings which appear at lines 63 through 65 and insert --

| Mole/mole CEP Ca(OH)$_2$ Acetic Acid | Weight Yield grams/100 grams CEP | G.C. Assay % BIS-BETA | Yield (% Theory) |
|---|---|---|---|

--.

In the Claims, Column 12, Claim 1, line 16, "90°" should read -- 90° C. --.

Claim 5, line 31, delete the word "The" and enter -- the --.

Signed and sealed this 13th day of November 1973.

(SEAL)
Attest:

EDWARD M. FLETCHER, JR.
Attesting Officer

RENE D. TEGTMEYER
Acting Commissioner of Patents